(12) United States Patent
Weber et al.

(10) Patent No.: US 7,851,080 B2
(45) Date of Patent: Dec. 14, 2010

(54) BATTERY COOLING PLATE DESIGN WITH DISCRETE CHANNELS

(75) Inventors: Derek R. Weber, Rochester, NY (US); Steven J. Spencer, Rochester, NY (US); Paul F. Spacher, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/403,590

(22) Filed: Mar. 13, 2009

(65) Prior Publication Data

US 2009/0258289 A1    Oct. 15, 2009

Related U.S. Application Data

(60) Provisional application No. 61/043,577, filed on Apr. 9, 2008.

(51) Int. Cl.
*H01M 10/50* (2006.01)
(52) U.S. Cl. .................. 429/120; 429/512; 429/514
(58) Field of Classification Search ............ 429/26, 429/34, 72, 120; *H01M 8/02, 8/04*
See application file for complete search history.

(56) References Cited

U.S. PATENT DOCUMENTS 6,866,955 B2 *   3/2005   Lee et al. .................... 429/26
7,399,551 B2     7/2008   Yagi et al.
2005/0271909 A1 * 12/2005 Bai et al. .................... 429/13
2006/0068267 A1 *  3/2006 Frank et al. ................. 429/38
2008/0299449 A1  12/2008  Yun et al.
2009/0258289 A1  10/2009  Weber et al.

FOREIGN PATENT DOCUMENTS

DE    10253000 A1 *  6/2004

* cited by examiner

*Primary Examiner*—Jerry Lorengo
*Assistant Examiner*—Jared Wood
(74) *Attorney, Agent, or Firm*—Reising Ethington P.C.

(57) ABSTRACT

One exemplary embodiment including a battery cooling plate has discrete channels. In one exemplary embodiment each of the channels has a width ranging from about 1 mm to about 5 mm. In another exemplary embodiment the battery cooling plate includes a first cooling channel having a flow path generally in a U shape, and a plurality of other channels each having a generally U-shaped flow path, and wherein the other flow channels are in a nested position with respect to the first flow channel. In another exemplary embodiment the battery cooling plate a battery cooling plate includes a serpentine shaped cooling flow path formed therein, the cooling flow path including a first cooling segment and an adjacent upstream second cooling segment, wherein the second cooling segment includes at least a first cooling channel and a second cooling channel and at least a first land interposed between the first cooling channel and second cooling channel, and wherein the second cooling segment has at least one more land and one more channel than the first cooling segment.

7 Claims, 3 Drawing Sheets

BATTERY COOLING PLATE DESIGN WITH DISCRETE CHANNELS

CROSS-REFERENCE TO RELATED APPLICATIONS

This application claims the benefit of U.S. Provisional Application No. 61/043,577 filed Apr. 9, 2008.

TECHNICAL FIELD

The field to which the disclosure generally relates includes battery cooling plates and products using the same.

BACKGROUND

FIG. 1 illustrates a battery cooling plate 10 having a charge channel 12, and a serpentine portion including a plurality of cooling segments 14 connected together in a serpentine design. The cooling segments include at least a first segment 16, second segment 18, third segment 19, fourth segment 20, fifth segment 22, sixth segment 24 and so forth. Each of the segments includes a relatively wide channel having an average width, illustrated by line W, may be about 20 mm. However, the battery cooling plate 10 shown in FIG. 1, having such a relatively large channel geometry is subject to deformation during assembly line vacuum and fill processes. Furthermore, such a design tends to allow air bubbles to be trapped in the system.

SUMMARY OF EXEMPLARY EMBODIMENTS OF THE INVENTION

One exemplary embodiment includes a product including a battery cooling plate having a serpentine shaped cooling flow path formed therein, the cooling flow path including a first cooling segment and an adjacent upstream second cooling segment, wherein the second cooling segment comprises at least a first cooling channel and a second cooling channel and at least a first land interposed between the first cooling channel and second cooling channel, and wherein the second cooling segment has at least one more land and one more channel than the first cooling segment.

Another exemplary embodiment includes a battery cooling plate including a first substrate, and a plurality of cooling channels formed out of the first substrate, the cooling channels including a bottom wall, and a first side wall and a second side wall each extending at an obtuse angle from the bottom wall. In one exemplary embodiment the channel has a width ranging from about 0.05 mm to less than 6 mm.

Another embodiment of the invention includes a product including a battery cooling plate and a first cooling channel having a flow path generally in a U shape, and a plurality of other channels each having a generally U-shaped flow path, and wherein the other flow channels are in a nested position with respect to the first flow channel.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
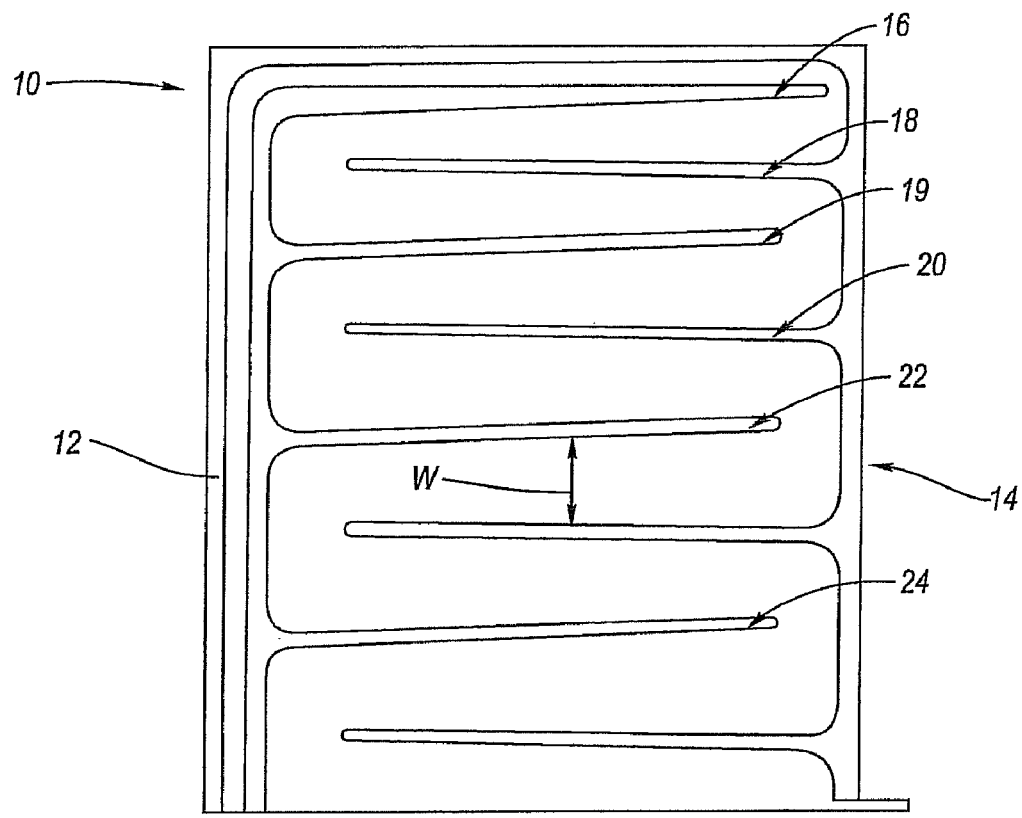
FIG. 1 illustrates a prior art battery cooling plate.
Figure 2:
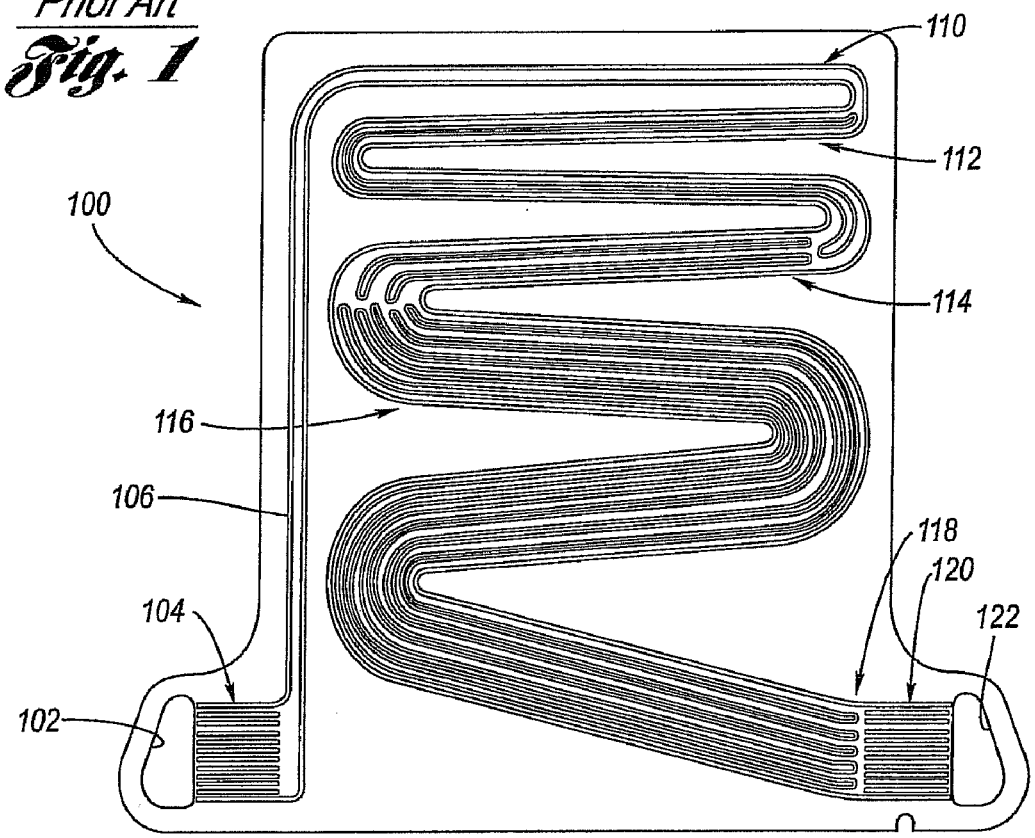
FIG. 2 illustrates a battery cooling plate according to one embodiment.

Referring now to FIG. 2, one embodiment may include a product including a battery cooling plate 100. The following describes the cooling plate 100 and the cooling path defined therein from the outlet opening 102 going in an upstream direction of the coolant flow direction toward the inlet opening 122. Cooling plate 100 may include a header outlet opening 102 communicating with a plurality of exit channels 104 which are connected to an upstream exit channel portion 106. The exit channel portion 106 is connected to an upstream first cooling segment 110. A second cooling segment 112 is provided upstream of the first cooling segment 110. Similarly, third and fourth cooling segments 114, 116 respectively, are provided upstream of the second cooling segment 112. A collector 118 may be provided upstream of the fourth cooling segment 116 that allows cooling fluid to evenly distribute to cooling plate channels. Inlet channels or tunnels 120 may be provided upstream of the collector 118 communicating with an inlet header opening 122.

A battery cooling plate constructed as shown and described above would be expected to have the characteristics set forth in the following table.

| Section | Tubes | Flow rate/tube (m3/s) | Velocity | Dh | Re | f | Tube length (m) | dP (kpa) |
|---|---|---|---|---|---|---|---|---|
| 1 | 6 | 1.92901E−07 | 0.114 | 0.00103 | 41.5 | 1.492 | 0.382 | 3.84 |
| 2 | 3 | 3.85802E−07 | 0.227 | 0.00103 | 83.1 | 0.746 | 0.121 | 2.43 |
| 3 | 2 | 5.78704E−07 | 0.341 | 0.00103 | 124.6 | 0.497 | 0.287 | 8.65 |
| 4 | 1 | 1.15741E−06 | 0.312 | 0.00098 | 108.7 | 0.690 | 0.309 | 11.35 |
| | | | | | | | Total dP | 26.2594 Kpa |
| | | | | | | | | 3.80762 Psi |

Figure 2A:
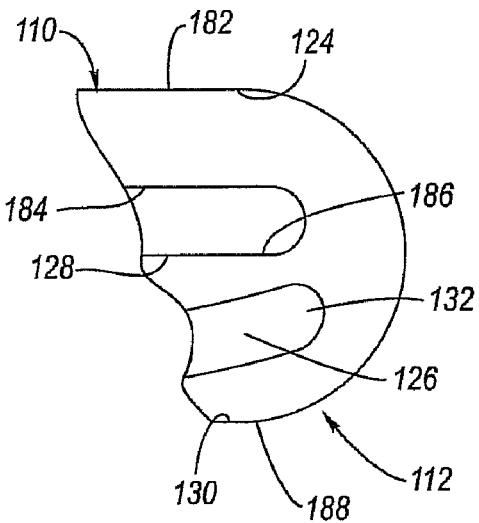
FIG. 2a is an enlarged, partial view of a portion of the battery cooling plate of FIG. 2.

In one embodiment, the battery cooling plate 100 includes adjacent first and second cooling sections. With the second upstream cooling section having one more channel and one more land than the adjacent upstream cooling segment. For example, referring now to FIG. 2A, in one embodiment, the first cooling segment 110 includes only a first channel 124 and no land. The adjacent upstream second cooling segment 112 includes a first channel 128 and a second channel 130 and a first land 126 therebetween. The first channel 128 may be defined in part by an outer wall 186 of the second cooling segment and the first land 126 and the second channel 130 may be defined by an outer wall 188 and the first land 126. The first land 126 may have a first end 132 and a second end 134 as shown in FIG. 2b.

Figure 2B:
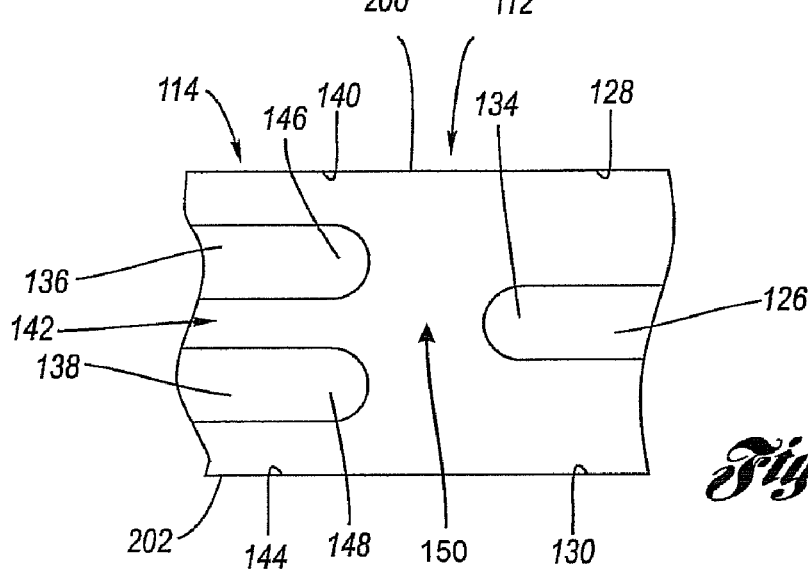
FIG. 2b is an enlarged portion of the battery cooling plate of FIG. 2.

Referring now to FIG. 2B, the third cooling segment 114 includes one more channel and one more land than the adjacent downstream segment 112. The third cooling segment 114 includes a first channel 140, a middle channel 142, and a third channel 144. The first channel 140 may be defined in part by a first outer wall 200 and a first land 136. The middle channel may be defined by the first land 136 and the second land 138. The third channel 144 may be defined by the second land 138 and the second outer wall 102 of the third cooling segment 114. The first land 136 may include a first end 146 and the second land 138 may include a first end 148. The ends 146 and 148 may be spaced a distance from the end 134 of the first land 126 of the second cooling segment 112, to provide a first transition zone 150 which is free of any lands and sufficient to allow cooling fluid to disperse from the three channels of the third cooling section 114 to the two channels of the second cooling section 112.

Figure 2C:
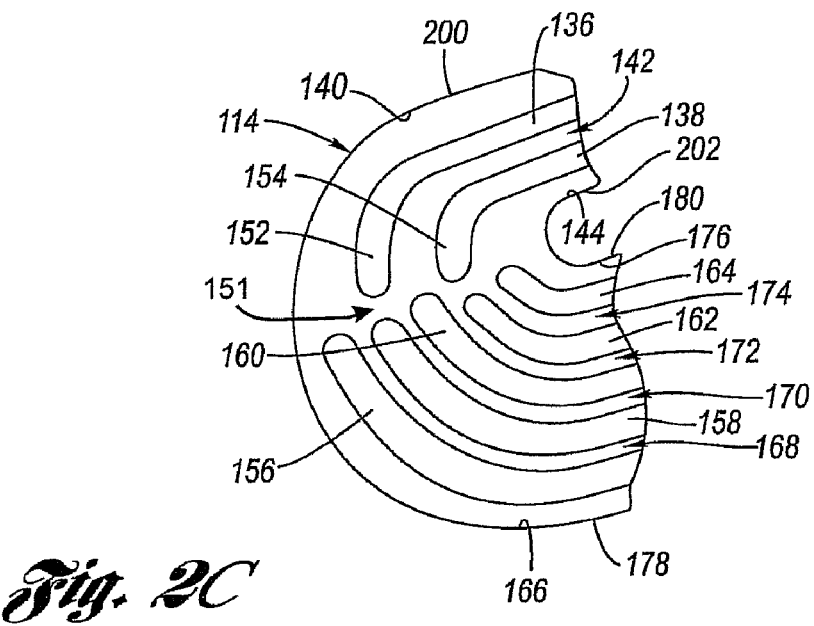
FIG. 2c is an enlarged, portion of the battery cooling plate of FIG. 2.

Referring now to FIG. 2C, the first land 136 of the third cooling section 114 may include a first end 152 and likewise the second land 138 may include a second end 154. The fourth cooling segment 116 may include at least one more channel and at least one more land than the previous adjacent downstream third cooling segment 114. As shown in FIG. 2C, the fourth cooling segment 116 may include a plurality of spaced apart lands, for example, a first land 156, second land 158, third land 160, fourth land 162 and fifth land 164. A first channel 166 is defined in part by a first outer wall 176 and the first land 156 of the fourth cooling segment 116. A second channel 168 may be defined by the first land 156 and the second land 158. A third channel 170 may be defined by the second land 158 and the third land 160. A fourth channel 172 may be defined by the third land 160 and the fourth land 162. A fifth channel 174 may be defined by the fourth land 162 and the fifth land 164. And a sixth channel 178 may be defined by a second outer wall 180 and the fifth land 164 of the fourth cooling segment 116. A second transition zone 151 where no land is present may be provided between land ends 152, 154 and land ends 157, 159, 161, 163, 165 to allow even distribution of cooling fluid from the channels of segment 116 into the channels of segment 114.

Adding channel side walls and lands (best seen in FIG. 6) as the width of various cooling segments increases fortifies the cooling plate and prevents portions thereof from being deformed under high vacuum and the filling operations during assembly line manufacturing. Furthermore, increasing the number of channels but with narrower widths in areas of the coolant flow path where the flow path is relatively wider increases the velocity through the channels and therefore reduces the likelihood that air will be trapped in the channels.

Figure 3:
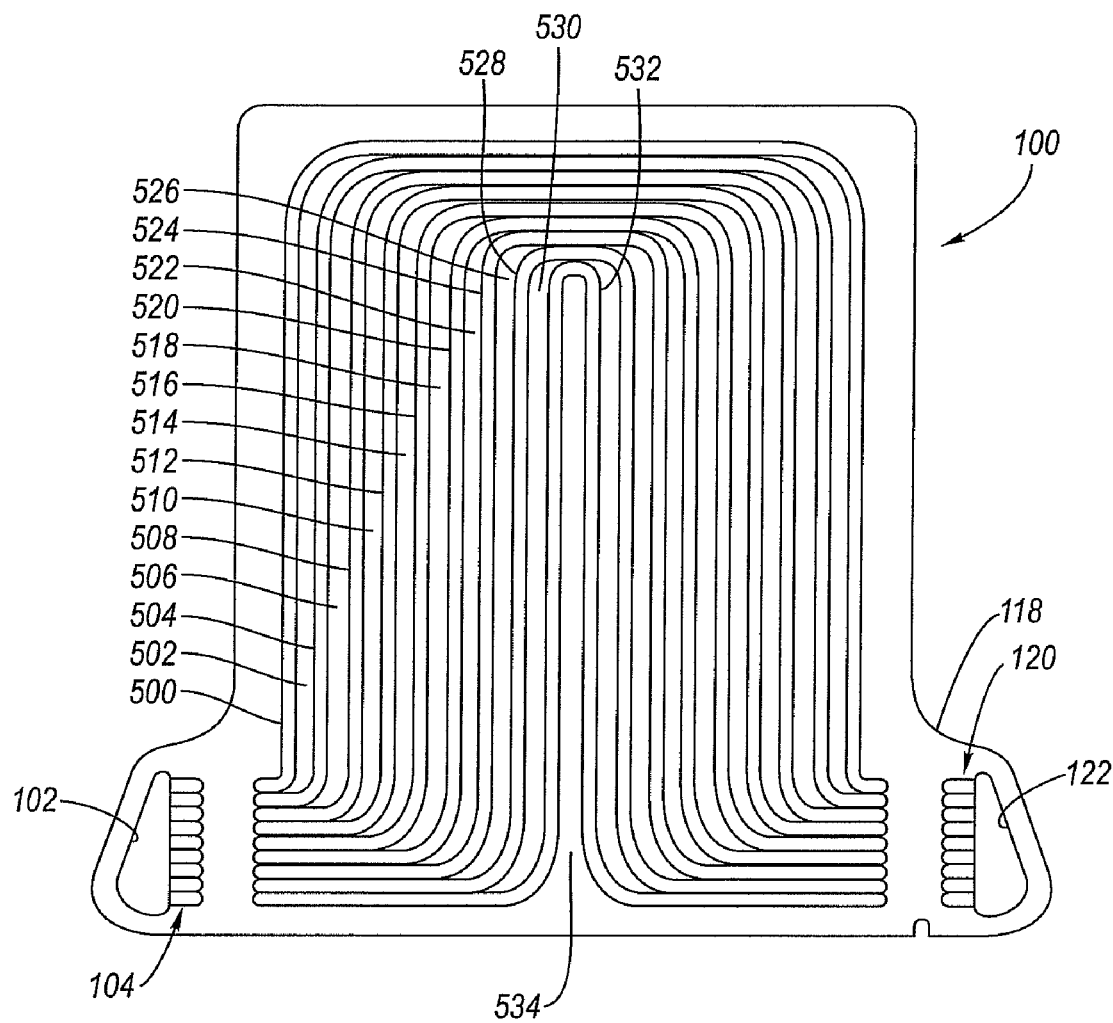
FIG. 3 illustrates another embodiment of a battery cooling plate including nested flow channels having a generally U-shaped flow path.

Referring now to FIG. 3, one exemplary embodiment includes a battery cooling plate 100 having a first cooling channel 500 communicating with an outlet header opening 102. The first cooling channel 500 has a generally U-shaped flow path. A second cooling channel 104 may be provided in a nested position with respect to the first cooling channel 500 and separated by a first land 502. A third channel 508 may be provided in a nested position with respect to the second channel 504 and separated by a second land 506. A fourth channel 512 may be provided in a nested position with respect to the third channel 508 and separated by a third land 510. In a similar fashion a plurality of other channels may be provided. For example, a fifth channel 516 may be separated from the fourth channel by a fourth land, a sixth channel 512 separated from the fifth channel by a fifth land 518, a seventh channel 524 separated from the sixth channel by a sixth land 522, and an eighth channel 528 separated from the seventh channel by a seventh land 526, a ninth channel 532 separated from the eight channel by eighth land 530. A central land 534 may be provided adjacent to the ninth channel 528. Again, the battery cooling plate is made less susceptible to deformation under filling and vacuum operations by the use of a plurality of relatively narrow channels to prevent entrapment of air or other gases in the channels. In the cooling plate 100 design showing in FIG. 3 all of the channels have substantial the same length.

Figure 4:
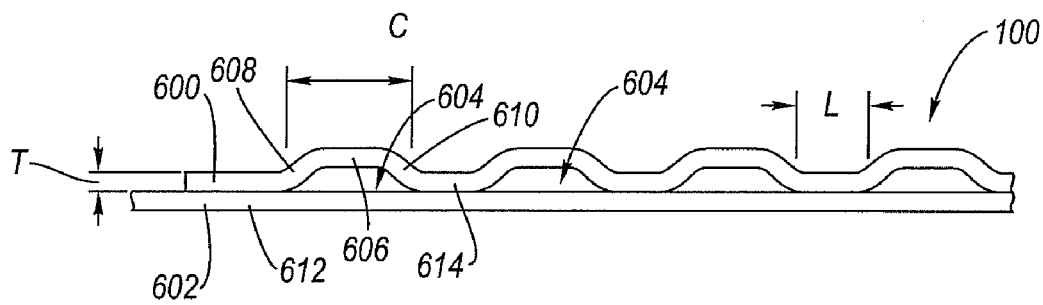
FIG. 4 is a sectional view of a battery cooling plate according to one embodiment.

Referring now to FIG. 4, in one exemplary embodiment, a battery cooling plate 100 may be provided and may include a first substrate 600 and a second substrate 602. The first substrate 600 may be stamped or otherwise formed to provide a plurality of channels 604 defined therein for flowing cooling fluid therethrough to cool a battery, such as a lithium-ion battery. In one embodiment, the width of the channel as illustrated by line C may be less than 6 mm. In other embodiments, the width C of the channel may range from about 1 mm to about 5 mm. In another embodiment, the width C of the cooling channel may be approximately 2 mm. The cooling channel 164 may be defined by a plurality of walls including a bottom wall 606, and a first side wall 608 and second side wall 610. The side walls 608, 610 may extend from the bottom wall 606 at an obtuse angle. A land portion 614 may be provided between adjacent channels 604. A top wall may help to define the channel 604 and may be provided by the second substrate 602 or by an end plate of one of the battery cells. In one embodiment, the length as illustrated by line L of the land portion 116 may range from about 1 mm to about 5 mm.

The first substrate 600 and second substrate 602 may be made from or include a variety of materials including but not limited to metals, alloys thereof, and polymeric materials. In one embodiment, the substrate 600, 602 may include aluminum. If a polymeric material is utilized, the material should have a relatively high thermal conductivity or fillers or additives may be incorporated into the polymeric material to increase the thermal conductivity thereof. The first substrate 600 may have a thickness T ranging from about 0.1 mm to about 0.5 mm.

The above description of embodiments of the invention is merely exemplary in nature and, thus, variations thereof are not to be regarded as a departure from the spirit and scope of the invention.

What is claimed is:

1. A product comprising a battery cooling plate having an outlet opening communicating with a plurality of exit channels and a plurality of inlet channels communicating with an inlet opening and a serpentine shaped cooling flow path communicating with the plurality of exit channels and the plurality of inlet channels, the cooling flow path including a first cooling segment and an adjacent upstream second cooling segment, and a third cooling segment upstream of the second cooling segment, wherein the second cooling segment comprises at least a first cooling channel and a second cooling channel and at least a first land interposed between the first cooling channel and second cooling channel, wherein the second cooling segment has at least one more land and one more channel than the first cooling segment, and wherein the third cooling segment has at least one more land and one more channel than the second cooling segment, wherein the plurality of exit channels are located downstream the first cooling segment and communicate with the first cooling segment, and wherein the plurality of exit channels comprises a number of individual channels that is greater than the number of individual cooling channels of the first cooling segment.

2. A product as set forth in claim 1, wherein the third cooling segment comprises at least a first cooling channel, a second middle cooling channel, and a third cooling channel, the third cooling segment also comprises at least a first land and a second land, the first land interposed between the first cooling channel and the second middle cooling channel, the second land interposed between the second middle cooling channel and the third cooling channel, and wherein an end of the first land of the second cooling segment generally confronts an opening of the second middle cooling channel across a transition zone located between the second cooling segment and the third cooling segment.

3. A product as set forth in claim 2, wherein the transition zone is free of any lands and free of any structures that could substantially interrupt coolant flow.

4. A product as set forth in claim 1, wherein the plurality of exit channels communicates with the first cooling segment through an exit channel portion which includes a single exit channel.

5. A product comprising a battery cooling plate having an outlet opening communicating with a plurality of exit channels and a plurality of inlet channels communicating with an inlet opening and a serpentine shaped cooling flow path communicating with the plurality of exit channels and the plurality of inlet channels, the cooling flow path including a first cooling segment, a second cooling segment upstream the first cooling segment, a third cooling segment upstream the second cooling segment, and a fourth cooling segment upstream the third cooling segment, the first cooling segment including a single cooling channel, the second cooling segment including no more than two separate and distinct cooling channels, the third cooling segment including no more than three separate and distinct cooling channels, and the fourth cooling segment including no more than six separate and distinct cooling channels, wherein the second cooling segment has at least one more land and one more channel than the first cooling segment, and wherein the third cooling segment has at least one more land and one more channel than the second cooling segment, wherein the plurality of exit channels are located downstream the first cooling segment and communicate with the first cooling segment, and wherein the plurality of exit channels comprises a number of individual channels that is greater than the number of individual cooling channels of the first cooling segment.

6. A product as set forth in claim 5, wherein a transition zone is located between each of the first, second, third, and fourth cooling segments, the transition zones each being free of any lands and free of any structures that could substantially interrupt coolant flow between the cooling segments.

7. A product as set forth in claim 5, wherein the plurality of exit channels are located downstream the first cooling segment and wherein the plurality of exit channels comprises a number of individual channels that is greater than the single cooling channel of the first cooling segment.

* * * * *